May 19, 1925.
F. J. LITTELL ET AL
1,538,440
STOCK CONTROLLED FEED FOR PRESSES
Filed April 4, 1923   3 Sheets-Sheet 1
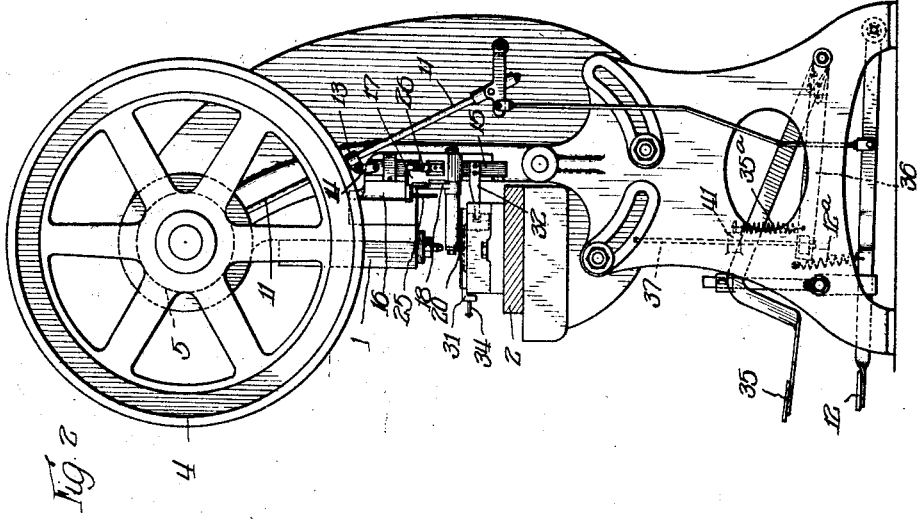
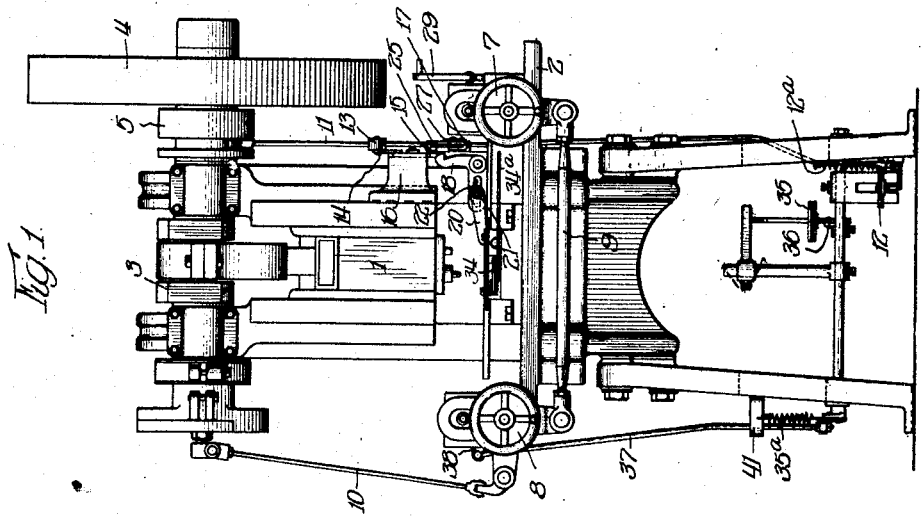
Witness:
R. Burkhardt
Inventors:
Frederick J. Littell
William N. Thode,
By Wilkinson, Huxley, Byron & Knight
attys.

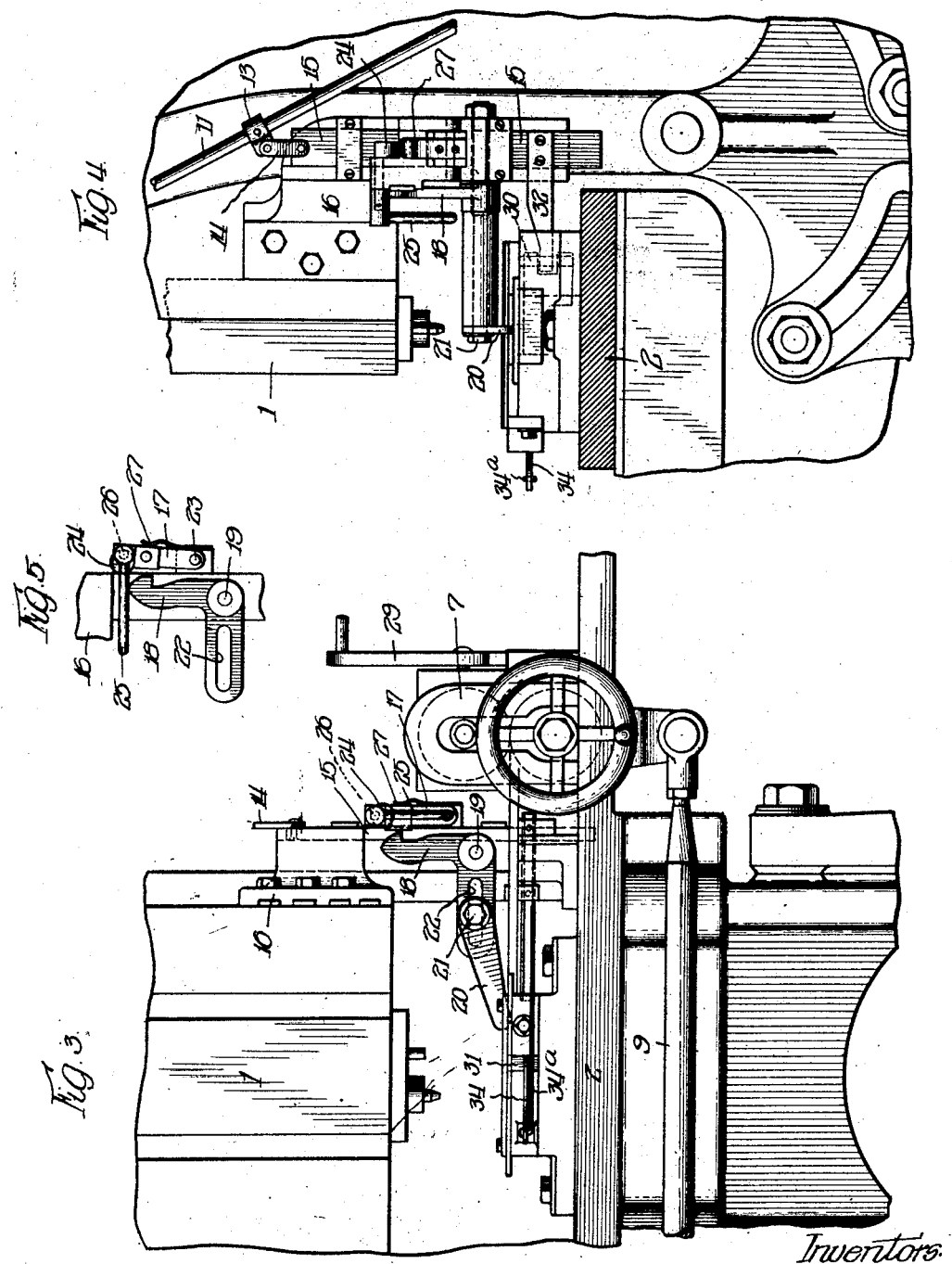

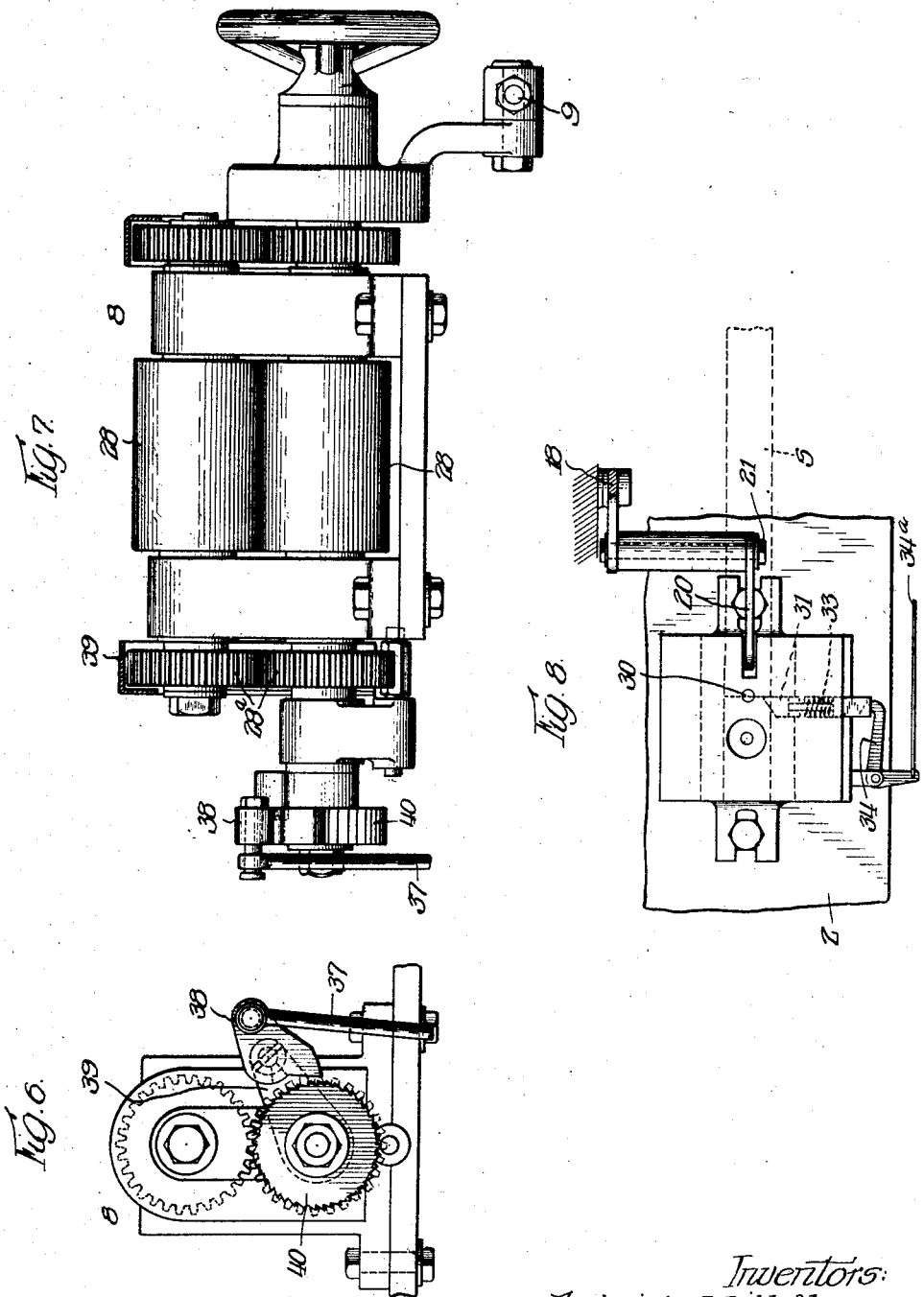

Patented May 19, 1925.

1,538,440

UNITED STATES PATENT OFFICE.

FREDERICK J. LITTELL AND WILLIAM N. THODE, OF CHICAGO, ILLINOIS, ASSIGNORS TO F. J. LITTELL MACHINE CO., OF CHICAGO, ILLINOIS, A CORPORATION OF ILLINOIS.

STOCK-CONTROLLED FEED FOR PRESSES.

Application filed April 4, 1923. Serial No. 629,821.

*To all whom it may concern:*

Be it known that we, FREDERICK J. LITTELL and WILLIAM N. THODE, citizens of the United States, residing, respectively, at Chicago, in the county of Cook and State of Illinois, and at Chicago, in the county of Cook and State of Illinois, have jointly invented certain new and useful Improvements in Stock-Controlled Feeds for Presses, of which the following is a specification.

This invention relates to feeding mechanism of the kind which automatically advances stock material to the tool or element of the machine which cuts, punches, shapes, or otherwise works the material to produce a desired effect thereon, and more especially to an automatic stop feeder of the type in which the presence of the stock is relied upon to keep the tool in operation, and the absence or exhaustion of the stock at a certain point on the machine causes the tool to cease operating.

Heretofore, automatic control of machines of this general type, has been upon the principle of starting the tool operation by the act of introducing the stock, thus making the machine unavailable for stock of very small gauge or material lacking in rigidity, and arrest of operation, due to exhaustion of the stock, was limited to the drive of the stock-working tool alone; moreover feed of stock was continuous from before introduction of the stock until after the scrap was completely ejected from the machine, and being limited to automatic action when once the stock was introduced and surrendered to the action of the feed, it necessarily continued its course through the machine. These operative principles are objectionable.

The primary object of the present invention is to establish an operative principle in machines of this general type, which, while insuring arrest of the stock-working tool immediately upon arrival of the rear end of the stock piece at a predetermined point before reaching the tool, will nevertheless permit the stock to be definitely spaced in relation to the tool, in each instance, before starting the feed, and will arrest the feed simultaneously with discontinuance of tool action and thereby avoid any possibility of striking any portion of the working end of the tool beyond the end of the stock piece, or the production of so-called "clips", or partial counterparts of the tool end, which may cause injury to the tool. Accordingly, one feature of the present invention consists in starting the action of both the tool and the feed by a voluntary movement of a member, such, for instance, as a foot lever, and thereafter maintaining the operation of both these elements by the presence of the stock in the machine, and arresting both of them by the exhaustion of the stock.

Other features of the invention incident to the preferred means for realizing this primary object consist in having for the stock feed and stock-working tool a common driving mechanism controlled by a single clutch; having this clutch under control of a connector normally moving to a position in which it arrests the transmission of drive to the tool and feed, but movable at will to a position in which it insures such drive; providing, for this connector, a releasable detent held, by the presence of the stock, in position to detain the connector in drive position after the connector has once been voluntarily moved to that position; providing a voluntarily actuated means, such, for instance, as a foot pedal, wholly independent of stock introduction for moving the connector to drive position; and providing a stop adapted to enter into the path of the stock to fix the initial position of the stock with respect to the position of the tool and the stroke of the feed, said stop being arranged either for voluntary introduction into said path at the time of introducing the stock to the machine, followed by automatic withdrawal when released, or else being arranged to stand normally in said path, to be encountered by the stock whenever the stock is introduced, but being positively withdrawn simultaneously with the voluntary movement of the connector to drive position so that the stock can then move on to the tool.

A further object of the invention is to provide means whereby, notwithstanding the presence of stock in the machine, the detent controlled thereby may be locked off from the connector in order that the latter may be permitted to return to clutch arresting position after each stroke of the machine induced by renewed voluntary action (foot lever depression), so that a series of single tool strokes and coordinated feed strokes may be executed until such time as the adjustments and work of the machine meet the approval of the operative, and the full automatic operation can safely begin.

A further object of the invention is to provide, in a machine of the kind above identified, means whereby, by voluntary action, for example, by operating a foot lever, the feed may be actuated at will after its automatic action has ceased, while the tool is at rest, in order that stock remnant or scrap can be ejected from the machine without danger of striking the tool beyond the end of the stock.

A further object incident to operation of the preferred means for realizing the object last named, is to provide means whereby a foot lever or other member, through which the feed is voluntarily operated, can be made to execute an abnormal stroke and impart movement to the foot lever or other member which moves the connector to drive position and starts the machine; so that by introducing a fresh piece of stock as soon as the scrap or spent stock has passed beyond the path of the tool, the operation of the machine can be resumed with minimum loss of time by simply imparting the extra length stroke to the feed pedal at the proper moment.

In order that the invention may be fully understood, it will be described in detail in connection with the preferred embodiment thereof illustrated in the accompanying drawings. In said drawings—

Figures 1 and 2 are, respectively, a front elevation and an end elevation of a standard type of punch press to which the novel features of the invention have been applied.

Figures 3 and 4 are views corresponding to Figures 1 and 2 showing parts thereof on an enlarged scale.

Figure 5 is a detail view of the lock-off for the detent.

Figures 6 and 7 are views of the feed mechanism at the discharge end of the machine as seen, respectively, from a position opposite to the view of Figure 1, and from the left-hand end thereof; and Figure 8 is a plan view of that portion of the machine concerned with the stops for positioning the stock; also the tripper or stock-control means for actuating the connector detent.

Referring to Figures 1 and 2, 1 represents the reciprocating plunger of a known type of punch press which we have herein identified generally as the "tool" since it merely typifies any one of a number of different machine elements that might operate to cut, punch, shape, or otherwise act upon stock fed beneath it; and 2 represents the bed which supports the die or other counterpart of the working end of the tool. Tool 1 is adapted to be actuated by means of the usual crank shaft 3 operated by fly wheel or band pulley 4 adapted to be brought into driving connection therewith or released therefrom by a clutch 5 in the well known manner. 7 and 8 represent, generally, feeding mechanism located, respectively, at the intake and discharge ends of the machine, each consisting, as hereinafter more fully described, of feed rolls caused to act in unison by means of connecting rod 9 and receiving their drive through the pitman 10 from the same shaft 3 that drives the tool 1, being thereby coordinated in their feeding action and arrest with the working strokes and arrest of the tool 1. In order to control the action of clutch 5, a connector 11 leads therefrom to a treadle 12, in principle identical with the control usually employed for machines of the type to which the invention is here shown applied; treadle 12 being held normally elevated by spring 12$^a$; and arrangement being such that whenever the treadle 12 is depressed the connector 11 is moved to drive position and the clutch 5 is permitted to move automatically into driving relation to the shaft 3.

As shown more clearly in Figures 3, 4, and 5, connector 11 is united through the sleeve 13 and link 14 with the slide plate 15 mounted in the guide 16 which is carried upon a stationary part of the machine so that the slide plate 15 partakes of the movements of the connector 11 by which it assumes its positions of drive and arrest. Mounted upon the slide plate 15 is a shoulder block 17 which lies normally in the path of a detent 18 which is pivoted at 19 upon the lower portion of the guide 16, and this detent is in the form of a bell crank lever and is provided with a feeler or finger 20 presented in the path of the stock that is fed beneath the tool 1, the part being so adjusted that whenever a piece of stock is present beneath the finger 20 the detent 18 will be held in position to engage the shoulder 17 and keep the slide plate 15 and connector 11 down in the drive position to which they have been moved by the treadle 12; but in the absence of such stock, as, for instance, when the rear end of the stock feeds beyond the finger, the detent will be rocked by gravity or other influence upon its pivot 19 to release the shoulder block 17 and permit the slide plate 15 and connector 11 to move upward and assume arresting position. Finger 20 is connected to the horizontal arm of the bell crank detent 18 through means of bolt 21 and slot 22 which permits the finger to be adjusted both horizontally in the direction of feed in order to determine the exact point at which the detent will be withdrawn, and also in a vertical plane to compensate for changes in thickness of stock that has to be worked.

In order that the machine may be operated by single strokes of the tool and coordinated strokes of the feed until such time as the adjustments and operation are found satisfactory, and particularly in initiating the operation with a given tool and stock, the shoulder block 17 is made movable relatively to the slide plate 15 upon which it is mounted, as, for instance, by pivoting it thereon at 23, and a cam 24 controlled by lever 25 is pivoted at 26 upon the shoulder block and adapted to be turned to such position, in bearing upon the slide plate, as will hold the shoulder block out of reach of the detent 18 or stop of the detent action, so that the machine will execute one stroke for each depression of the treadle 12 and immediately thereafter come to rest; but as soon as the cam lever 25 is lowered to vertical position, the block 17 will be returned by spring 27 to engagement with the detent 18 and then each depression of the treadle 12 will be followed by a continuing operation of the machine until the stock piece passes beyond the finger 20, or until the cam lever 25 is voluntarily thrown up, when the connector 11 will move to arresting position. Obviously, the connector 11 can be equipped in any other desired manner to cause the slide plate 15 to partake of its movements to the two positions of drive and arrest.

As shown in Figures 6 and 7, the two feed elements at the intake and discharge ends of the machine comprise coacting rolls 28, driven in unison through gears 28ª, but the particular detail of this feed mechanism forms no part of the present invention. It is to be noted, however, that the intake rolls are adapted to be separated in a known manner through means of a crank lever 29 in order to admit the stock between them, and the present invention contemplates the use of a stop 30 or 31, shown more clearly in Figure 8, against which the forward end of the stock strikes as it is introduced, as suggested by the work-piece S in Figure 8, so that the forward end of the stock will be advanced safely beyond the working end of the tool by the first stroke of the feed and avoid the formation of a clip. Stop 30 is under control of an arm 32 (Figures 2 and 4) carried by the slide plate 15, so that whenever the slide plate 15 is moved downward, as an incident to releasing the clutch 5 for driving action, said stop 30 will be automatically withdrawn from the path of the stock and the latter can at once move forward under the action of the feed rolls. The stop 31, however, is normally retracted from the path of the stock by means of a spring 33, and is voluntarily interposed in such path by means of crank lever 34 which may be controlled by the pull rod 34ª extending to some point within convenient reach of the operator at the time of introducing the stock into the machine.

With the operative feature of arresting both the feed and the tool when the stock becomes exhausted, it becomes desirable to provide means for voluntarily actuating the feed independently of its automatic action, and for this purpose the second pedal 35 (Figures 1 and 2) is provided and connected through its operating arm 36 and rod 37 with pawl 38 on the radius arm 39 mounted concentrically with one of the rolls 28 of the feed at the discharge end of the machine, so that when the pedal 35 is depressed pawl 38 will be thrown into engagement with the ratchet 40 and will impart a feed stroke to the discharge rolls. Pedal 35 is drawn normally upward by means of a spring 35ª and is arrested in its upward movement by the adjustable arm 41. With this arrangement, as soon as the operator, who may be attending a number of machines, observes the automatic arrest of a machine by exhaustion of the stock, he proceeds at once to open the intake rolls through means of lever 29 and introduce a fresh piece of stock, at the same time working the pedal 35 to advance the scrap well beyond the tool, whereupon the lever 29 is moved in the opposite direction to bring the intake rolls together upon the fresh stock, and the machine is ready for a new start.

In order to conveniently and quickly start the operation of the machine upon the fresh piece of stock, and to avoid loss of time incident to removing the foot from the pedal 35 to the treadle 12, pedal 35 or some projection thereof is located to cause it to assume a path that overlaps the path of the treadle 12 so that while pedal 35 may be operated with sufficient amplitude to promptly feed the scrap until its rear end has passed the tool, as soon as it is observed to have reached such position, the operator executes a long stroke of the pedal 35 to bring it down upon the treadle 12 and cause the latter to move the connector 11 downward to drive position, when the automatic operation of the machine will be resumed.

We claim:

1. In a machine of the class described, a tool, driving mechanism for said tool, means responsive to the presence of stock in the machines, having a connection through which it controls said driving mechanism, and means interposed in said last-named connection through which to lock off the control thereof; said connection embodying a movable shoulder and a detent coacting therewith; and said locking off means comprising a cam movable to separate said shoulder and detent.

2. In a machine of the class described, a tool, driving mechanism therefor, a connector through which said driving mechanism is controlled, a detent adapted to restrain said connector, means responsive to the presence of stock in the machine adapted to control said detent, and voluntarily controlled means for locking off said detent from said connector.

3. In a machine of the class described, a tool, driving mechanism therefor, a connector controlling said driving mechanism and movable to an arresting position and to a releasing position with respect to the driving mechanism, a detent automatically engaging said connector as it reaches its releasing position, a stock controlled device controlling said detent, and a lock off device adapted to prevent the detent reaching said connector.

4. In a machine of the class described, a tool, driving mechanism therefor, a connector controlling said driving mechanism and movable to an arresting position and to a releasing position with respect to the driving mechanism, a detent automatically engaging said connector as it reaches its releasing position, a stock controlled device controlling said detent, and a lock off device adapted to prevent the detent reaching said connector; said connector being provided with a shoulder movably mounted thereon; and said lock off device comprising a cam adapted to impart movement to the shoulder.

5. In a machine of the class described, a tool, a normally arrested driving mechanism therefor, a connector adapted to release said driving mechanism to drive the tool, a voluntarily actuated member for moving said connector to position which permits the tool to be driven, a detent adapted to arrest said connector in said position, and a stock actuated control for said detent controlling the arrest only of the drive.

6. In a machine of the class described, a tool, a stock feeder, an automatic drive for both tool and stock feeder, a connector for initiating said drive, voluntarily actuated means for moving said connector to start the drive, a detent for said connector, a stock feeler adapted to withdraw said detent, and a voluntary feed actuator independent of the automatic drive for the feeder and adapted to act after the automatic drive has been arrested.

7. In a machine of the class described, a tool, a stock feeder, an automatic drive for both tool and stock feeder, a connector for initiating said drive, voluntarily actuated means for moving said connector to start the drive, a detent for said connector, a stock feeler adapted to withdraw said detent, and a voluntary feed actuator independent of the automatic drive for the feeder and adapted to act after the automatic drive has been arrested; said voluntary feed actuator being adapted by an abnormal movement to move said connector.

8. In a machine of the character described, a tool, a feeder, automatic driving mechanism for said tool and feeder, a voluntary driving mechanism for said feeder, a connector adapted to control the automatic driving mechanism, a lever for moving said connector, and a lever for moving said voluntary driving mechanism, adapted to engage the lever which moves the connector.

Signed at Chicago, Illinois, this 30th day of March, 1923.

FREDERICK J. LITTELL.
WILLIAM N. THODE.